(12) United States Patent
Takahashi et al.

(10) Patent No.: US 10,247,599 B2
(45) Date of Patent: Apr. 2, 2019

(54) ROTATING MACHINE ABNORMALITY DETECTION DEVICE AND METHOD AND ROTATING MACHINE

(71) Applicant: Kabushiki Kaisha Kobe Seiko Sho (Kobe Steel, Ltd.), Hyogo (JP)

(72) Inventors: Eiji Takahashi, Kobe (JP); Kaname Araki, Kobe (JP); Shugo Takaki, Takasago (JP); Yasuharu Matsumoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 163 days.

(21) Appl. No.: 15/328,308

(22) PCT Filed: Aug. 18, 2015

(86) PCT No.: PCT/JP2015/073120
§ 371 (c)(1),
(2) Date: Jan. 23, 2017

(87) PCT Pub. No.: WO2016/039088
PCT Pub. Date: Mar. 17, 2016

(65) Prior Publication Data
US 2017/0219420 A1    Aug. 3, 2017

(30) Foreign Application Priority Data

Sep. 12, 2014 (JP) ................................ 2014-185873

(51) Int. Cl.
*G01H 1/00* (2006.01)
*G01H 17/00* (2006.01)
*G01M 99/00* (2011.01)

(52) U.S. Cl.
CPC ............. *G01H 1/003* (2013.01); *G01H 17/00* (2013.01); *G01M 99/00* (2013.01)

(58) Field of Classification Search
CPC ..................................................... G01H 17/00
(Continued)

(56) References Cited

U.S. PATENT DOCUMENTS 4,237,454 A * 12/1980 Meyer ................... G01H 1/003
310/323.21
4,425,798 A * 1/1984 Nagai .................... G01H 1/003
702/77

(Continued)

FOREIGN PATENT DOCUMENTS

| CN | 102519579 A | 6/2012 |
| JP | H04-106429 A | 4/1992 |

(Continued)

OTHER PUBLICATIONS

Notification of Transmittal of Translation of the International Preliminary Report on Patentability (Chapter I) and Translation of Written Opinion of the International Searching Authority; PCT/JP2015/073120; dated Mar. 23, 2017.

(Continued)

*Primary Examiner* — Jacques M Saint Surin
(74) *Attorney, Agent, or Firm* — Studebaker & Brackett PC (57) ABSTRACT

A rotating machine abnormality detection device and a rotating machine abnormality detection method according to the present invention are designed to detect an abnormality in a rotating machine including a rotary member rotatable about a predetermined axis, and detect an initial abnormality in the rotating machine based on first measurement data obtained by measuring a vibration in an ultrasonic wave band caused by the rotary member. A rotating machine according to the present invention includes the rotating machine abnormality detection device.

11 Claims, 5 Drawing Sheets

(58) Field of Classification Search
USPC .......................................................... 73/584
See application file for complete search history.

(56) References Cited

U.S. PATENT DOCUMENTS

| | | | |
|---|---|---|---|
| 4,669,315 A | 6/1987 | Sato et al. | |
| 4,685,335 A | 8/1987 | Sato et al. | |
| 5,058,434 A * | 10/1991 | Zaschel | G01N 29/12 340/682 |
| 5,144,840 A * | 9/1992 | Whipple | G01H 1/003 73/660 |
| 5,533,400 A * | 7/1996 | Gasch | G01H 1/003 73/593 |
| 7,184,930 B2 * | 2/2007 | Miyasaka | B61F 15/20 246/169 A |
| 2005/0072234 A1 * | 4/2005 | Zhu | G01H 1/00 73/579 |
| 2011/0019674 A1 * | 1/2011 | Iovanna | H04L 45/02 370/392 |
| 2015/0040650 A1 * | 2/2015 | Lacaille | G01M 15/14 73/112.01 |

FOREIGN PATENT DOCUMENTS

| | | |
|---|---|---|
| JP | H08-043193 A | 2/1996 |
| JP | H08-166330 A | 6/1996 |
| JP | 2001-074616 A | 3/2001 |
| JP | 2002-181038 A | 6/2002 |
| JP | 2010-234403 A | 10/2010 |
| JP | 2012-208045 A | 10/2012 |

OTHER PUBLICATIONS

International Search Report issued in PCT/JP2015/073120; dated Nov. 10, 2015.
The extended European search report issued by the European Patent Office dated Apr. 18, 2018, which corresponds to EP15839521.0-1003 and is related to U.S. Appl. No. 15/328,308.
Yongbo Shao et al., "Development of acoustic emission and vibration monitoring instrument for rotating machinery", Proceedings of SPIE, Oct. 18, 2004, pp. 317-321; vol. 2620.

* cited by examiner

ROTATING MACHINE ABNORMALITY DETECTION DEVICE AND METHOD AND ROTATING MACHINE

TECHNICAL FIELD

The present invention relates to a rotating machine abnormality detection device and a rotating machine abnormality detection method for detecting an abnormality in a rotating machine, and a rotating machine including the rotating machine abnormality detection device.

BACKGROUND ART

For example, rotating machines such as an electric motor, a generator, a compressor, and a pump include a rotary member rotatable about a predetermined axis. Such rotating machines are used in various plants, and regularly inspected to check the operating state. A tool called a listening rod is used in the inspection. The listening rod is usually made of metal and in the form of a thin rod. In the inspection, a distal end of the listening rod is put on a portion of the rotating machine to be measured and a base end of the listening rod is put on an inspector's ear. Thereafter, the inspector listens to a vibration noise of the rotating machine via the listening rod and determines the presence/absence of an abnormal noise (see Patent Literature 1, for example).

On the other hand, Patent Literature 2, for example, discloses a rotating machine abnormality diagnosis device as a device for making a diagnosis of abnormality in a rotating machine. The rotating machine abnormality diagnosis device disclosed in Patent Literature 2 detects a vibration of the rotating machine and performs a continuous wavelet transform and adds transform signals along the frequency axis to determine whether there is an abnormality or not based on an addition result. In this manner, the rotating machine abnormality diagnosis device disclosed in Patent Literature 2 detects an abnormality due to damage occurring in a bearing of the rotating machine.

By the way, in the abnormality determination of the rotating machine using the listening rod, the accuracy of the determination depends on the expertise of the inspector, and therefore it is difficult to determine the presence/absence of an abnormality objectively and reliably. In particular, an abnormality in the rotating machine is preferred to be detected in its initial stage, but a higher expertise is required for detection of a more initial abnormality.

On the other hand, although the rotating machine abnormality diagnosis device disclosed in Patent Literature 2 determines the presence/absence of an abnormality based on a vibration of the rotating machine, the frequency band that can be recognized as a vibration is a band where a steady vibration such as a so-called characteristic vibration of the device overlaps. This makes it difficult to detect an initial abnormality.

CITATION LIST

Patent Literature

Patent Literature 1: Japanese Unexamined Patent Publication No. 2012-208045
Patent Literature 2: Japanese Unexamined Patent Publication No. 2001-74616

SUMMARY OF INVENTION

The present invention has been made in view of the above-mentioned situations, and has an object of providing a rotating machine abnormality detection device and a rotating machine abnormality detection method capable of detecting an initial abnormality occurring in a rotating machine, and a rotating machine including the rotating machine abnormality detection device.

A rotating machine abnormality detection device and a rotating machine abnormality detection method according to the present invention are designed to detect an abnormality in a rotating machine including a rotary member rotatable about a predetermined axis, and detect an initial abnormality in the rotating machine based on first measurement data obtained by measuring a vibration in an ultrasonic wave band caused by the rotary member. The rotating machine abnormality detection device and the rotating machine abnormality detection method according to the present invention can detect an initial abnormality occurring in a rotating machine. In addition, a rotating machine according to the present invention includes the rotating machine abnormality detection device. Therefore, according to the present invention, a rotating machine including the rotating machine abnormality detection device is provided.

These and other objects, features and advantages of the present invention will become more apparent upon reading the following detailed description along with the accompanying drawings.

DESCRIPTION OF EMBODIMENTS

Hereinafter, an embodiment of the present invention will be described with reference to the accompanying drawings. Elements denoted by the same reference numerals in the drawings have the same configuration and, therefore, repeated descriptions will be appropriately omitted. In the present specification, elements are denoted by a same reference numeral when being referred to collectively, and are denoted by a same reference numeral accompanied by a different respective reference character when being referred to individually.

Figure 1:
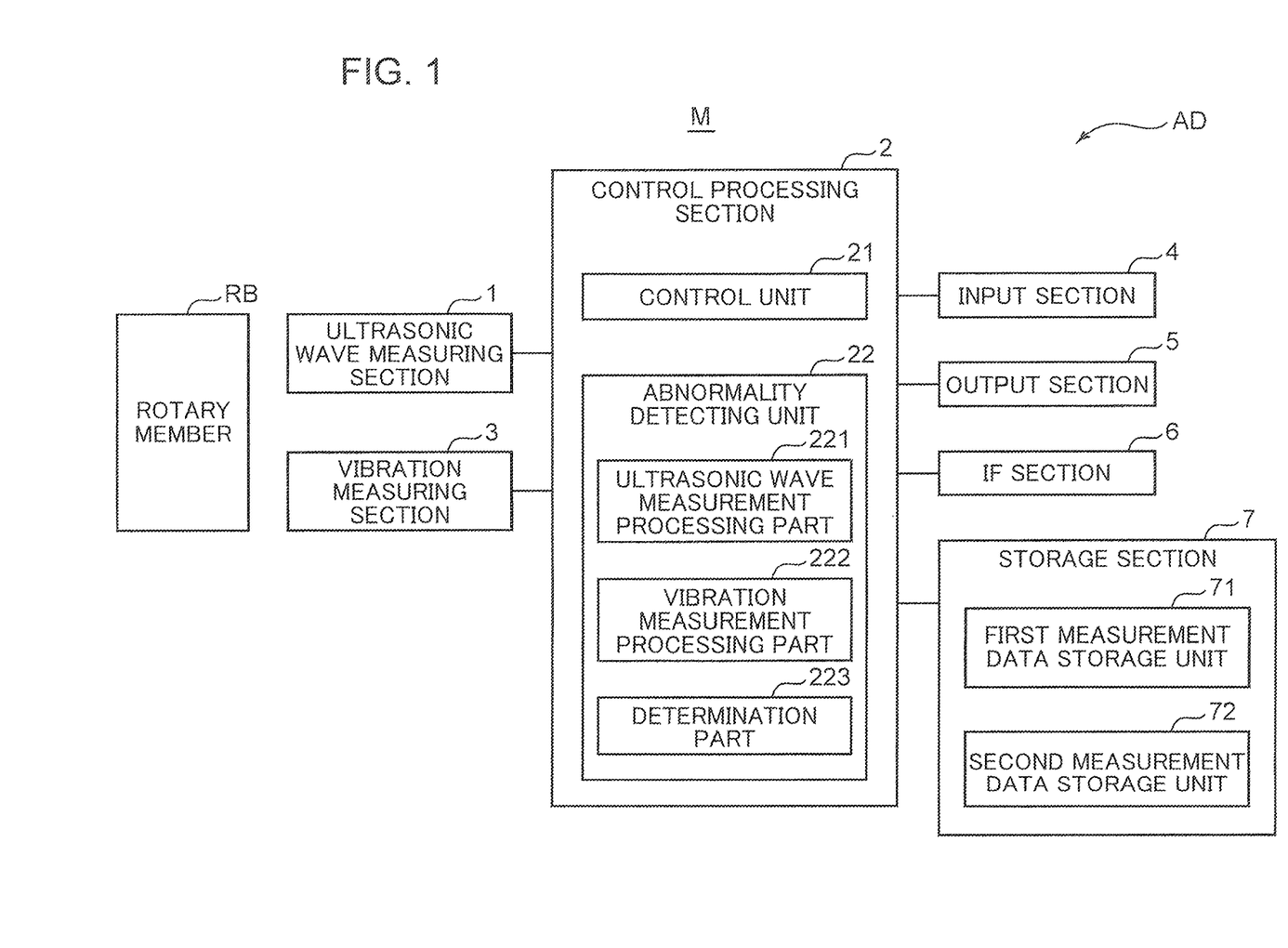
FIG. 1 is a block diagram showing a configuration of a rotating machine including a rotating machine abnormality detection device according to an embodiment.
Figure 2:
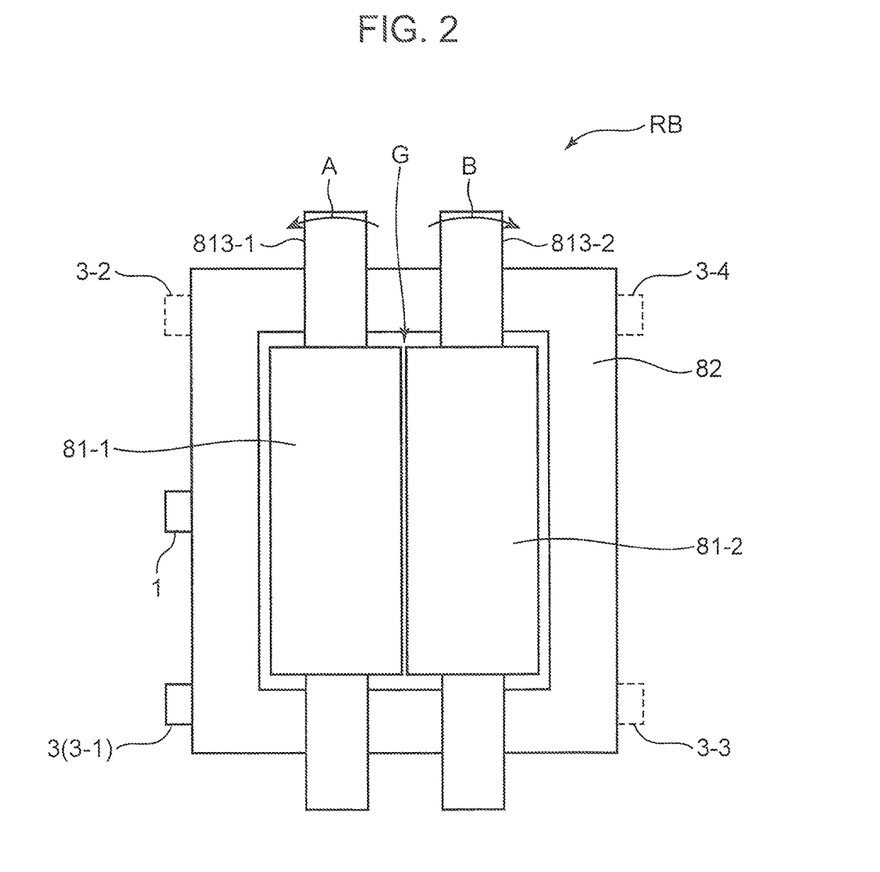
FIG. 2 is a schematic top view of an example of a rotary member in the rotating machine shown in FIG. 1.
Figure 3:
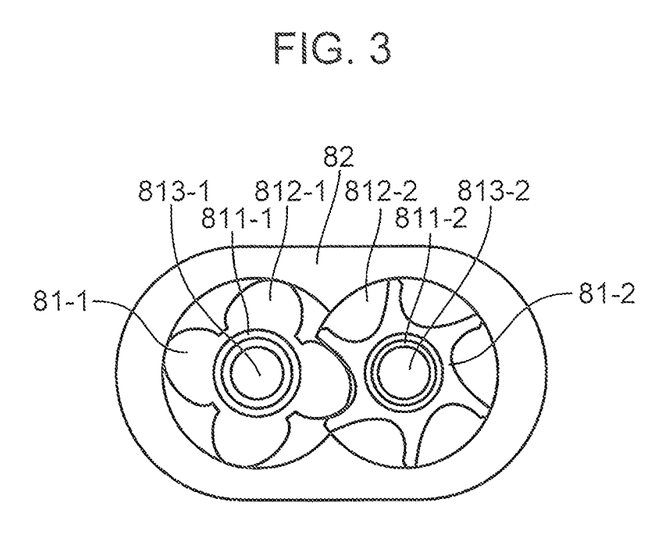
FIG. 3 is a schematic sectional view of the rotary member shown in FIG. 2.

FIG. 1 is a block diagram showing a configuration of a rotating machine including a rotating machine abnormality detection device according to the embodiment. FIG. 2 is a schematic top view of an example of a rotary member in the rotating machine shown in FIG. 1. FIG. 3 is a schematic sectional view of the rotary member shown in FIG. 2.

A rotating machine M according to the embodiment includes a rotary member RB rotatable about a predetermined axis and, in the present embodiment, a rotating machine abnormality detection device AD for detecting an abnormality in the rotary member RB, as shown in FIG. 1. The rotating machine abnormality detection device AD according to the present embodiment includes, for example, as shown in FIG. 1, an ultrasonic wave measuring section 1, and a control processing section 2 having an abnormality detecting unit 22. In the example shown in FIG. 1, the rotating machine abnormality detection device AD further includes a vibration measuring section 3, an input section 4, an output section 5, an interface section (IF section) 6, and a storage section 7.

The rotating machine M including the rotating machine abnormality detection device AD according to the present embodiment may be any device including the rotary member RB, such as an electric motor, a generator, a compressor or a pump, but here, the rotating machine M in the form of a compressor will be described as an example.

The rotating machine M in the form of a compressor includes the rotary member RB functioning as a compressor for pressure feeding fluid, and an unillustrated peripheral device for rotationally driving the rotary member RB. The rotary member RB includes, for example, a pair of first and second sub rotary members 81-1 and 81-2 defining a predetermined gap G therebetween and engageable with each other, and a casing 82 housing the first and second sub rotary members 81-1 and 81-2, as shown in FIGS. 2 and 3.

The first sub rotary member 81-1 serves as a male rotor in the compressor, and roughly includes a first sub rotary member body 811-1, a plurality of projecting portions 812-1 formed on a circumferential surface of the first sub rotary member body 811-1, and a first rotary shaft 813-1 coaxial with the first sub rotary member body 811-1. Such first sub rotary member 81-1 is driven to rotate, for example, counterclockwise (in the direction of the arrow A) about the first rotary shaft 813-1. The second sub rotary member 81-2 serves as a female rotor in the compressor, and roughly includes a second sub rotary member body 811-2, a plurality of recesses 812-2 formed on a circumferential surface of the second sub rotary member body 811-2, and a second rotary shaft 813-2 coaxial with the second sub rotary member body 811-2. Such second sub rotary member 81-2 is driven to rotate, for example, clockwise (in the direction of the arrow B) about the second rotary shaft 813-2.

Hereinafter, the plurality of projecting portions 812-1 formed on the circumferential surface of the first sub rotary member 81-1 will be referred to as "the projecting portions 812-1" and each one of the plurality of projecting portions 812-1 will be referred to as "projecting portion 812-1". The plurality of recessed portions 812-2 formed on the circumferential surface of the second sub rotary member 81-2 will be referred to as "the recessed portions 812-2" and each one of the plurality of recessed portions 812-2 will be referred to as "recessed portion 812-2".

The first sub rotary member 81-1 rotates counterclockwise and the second sub rotary member 81-2 rotates clockwise, so that corresponding ones of the projecting portions 812-1 and the recessed portions 812-2 successively engage with each other. In other words, a counterclockwise turn of the first sub rotary member 81-1 and a clockwise turn of the second sub rotary member 81-2 allow one projecting portion 812-1 and one recessed portion 812-2 to engage with each other, and respective further turns of the sub rotary members 81-1 and 81-2 cause disengagement and allow the next projecting portion 812-1 and recessed projection 812-2 to engage with each other, and respective further turns of the sub rotary members 81-1 and 81-2 cause disengagement and allow the ones after the next projecting portion 812-1 and recessed projection 812-2 to engage with each other. This is repeated to compress fluid.

In the engagement between the projecting portion 812-1 and the recessed portion 812-2, the projecting portion 812-1 is placed in the recessed portion 812-2, but in the normal state, the projecting portion 812-1 and the recessed portion 812-2 are not in contact with each other and define the predetermined gap G therebetween. A contact between the projecting portion 812-1 and the recessed portion 812-2 means a contact between the first and second sub rotary members 81-1 and 81-2, which is an abnormal state.

The casing 82 is in the form of a hollow cylinder having an oval shape in cross section, and having a space for accommodating the first and second sub rotary members 81-1 and 81-2 adjacently arranged with respective axes extending in parallel with each other and at a predetermined space from the inner circumferential surface of the casing 82. The casing 82 is formed with an unillustrated flow inlet for receiving fluid to be compressed at one end in an axial direction of the first and second sub rotary members 81-1 and 81-2, and an unillustrated flow outlet for discharging fluid compressed by the first and second sub rotary members 81-1 and 81-2 at the other end.

In order to detect an abnormality in the rotary member by the rotating machine abnormality detection device AD, in the present embodiment, an ultrasonic measuring section 1 is mounted at a predetermined first position and a vibration measuring section 3 (vibration measuring unit 3-1) is mounted at a predetermined second position on the outer surface of the casing 82. The ultrasonic wave measuring section 1 may include a plurality of ultrasonic wave measuring units mounted at different positions on the casing 82, and the vibration measuring section 3 may include a plurality of vibration measuring units mounted at different positions on the casing 82. As an example, FIG. 2 shows three vibration measuring units 3-2 to 3-4 indicated by dashed lines, in addition to the above-mentioned vibration measuring unit 3-1.

The ultrasonic wave measuring section 1 is a device that is connected to the control processing section 2, and measures a vibration in an ultrasonic wave band (at a frequency from 100 kHz to 1 MHz, for example) caused by the rotary member RB in order to detect an abnormality occurring in the rotating machine M, in particular, in the rotary member RB, the ultrasonic wave measuring section 1 being in the form of an AE (Acoustic Emission) sensor, for example. A characteristic vibration of the rotating machine M (rotary member RB) is unlikely to fall within the ultrasonic wave band, and therefore, the ultrasonic wave measuring section 1 for measuring a vibration in the ultrasonic wave band is suitable to detect an initial abnormality. The ultrasonic wave measuring section 1 including the AE sensor detects and measures an elastic wave in the ultrasonic wave band caused by the rotary member RB due to an abnormality such as a contact. First measurement data obtained by the ultrasonic wave measuring section 1 is outputted to the control processing section 2. More specifically, the ultrasonic wave measuring section 1 detects a vibration in the ultrasonic wave band and outputs to the control processing section 2 a measurement result of the vibration in the ultrasonic wave band as first measurement data. The control processing section 2 samples the first measurement data inputted from the ultrasonic wave measuring section 1 at predetermined first time intervals (at first sampling intervals). Consequently, the control processing section 2 obtains chronological first measurement data successive at the first sampling intervals.

The vibration measuring section 3 is a device that is connected to the control processing section 2, and measures a vibration in an audible wave band caused by the rotary member RB in order to detect an abnormality occurring in the rotating machine M, in particular, in the rotary member RB, the vibration measuring section 3 being in the form of an accelerometer, for example. The vibration measuring section 3 including the accelerometer detects and measures an elastic wave in the audible band caused by the rotary member RB due to an abnormality such as a contact. Second measurement data obtained by the vibration measuring section 3 is outputted to the control processing section 2. More specifically, the vibration measuring section 3 detects a vibration in the audible band and outputs to the control processing section 2 a measurement result of the vibration in the audible band as second measurement data. The control processing section 2 samples the second measurement data inputted from the vibration measuring section 3 at predetermined second time intervals (at second sampling intervals). Consequently, the control processing section 2 obtains chronological second measurement data successive at the second sampling intervals. The first sampling interval and the second sampling interval may be equal to or different from each other.

The input section 4 is a device that is connected to the control processing section 2 and inputs, to the rotating machine abnormality detection device AD (rotating machine M), various kinds of commands such as a command instructing start of abnormality detection, and various kinds of data necessary for detecting an abnormal input of an identifier or the like in the rotating machine M (or in the rotary member RB) serving as the subject of abnormality detection, for example. Examples of the input section 4 include a plurality of input switches to which predetermined functions are respectively assigned, a keyboard, a mouse, and the like. The output section 5 is a device that is connected to the control processing section 2 and outputs a command or data inputted from the input section 4, and various results detected or measured by the rotating machine abnormality detection device AD, according to control by the control processing section 2. Examples of the output section 5 include a display device such as a CRT display, a LCD, and an organic EL display, a printing device such as a printer, and the like.

The input section 4 and the output section 5 may constitute a touch panel. In the case of constituting a touch panel, the input section 4 is, for example, in the form of a position input device of a resistive film type, an electrostatic capacitance type or the like that detects and inputs an operation position, and the output section 5 is in the form of a display device. In the touch panel, the position input device is provided on a display surface of the display device, and when one or a plurality of input content candidates that can be inputted is displayed on the display device and a user touches a display position where a desired input content is displayed, the position input device detects the touched position and the display content displayed on the detected position is inputted to the rotating machine abnormality detection device AD (rotating machine M) as a content inputted by the user's operation. Since such a touch panel is easy for a user to intuitively understand input operation, a rotating machine abnormality detection device AD (rotating machine M) easy to be handled by a user can be provided.

The IF section 6 is a circuit that is connected to the control processing section 2 and inputs and outputs data to and from an external device according to control by the control processing section 2. Examples of the IF section 6 include a serial communication type interface circuit using the RS-232C, an interface circuit using the USB (Universal Serial Bus) standard, and the like.

The storage section 7 is connected to the control processing section 2, and stores a control program for causing each section of the rotating machine abnormality detection device AD to operate in accordance with the respective function according to control by the control processing section 2, various programs such as a rotating machine abnormality detection program for detecting an abnormality in the rotary machine M, information necessary for execution of each program, and the like, the storage section 7 also serving as a so-called working memory for the control processing section 2. The storage section 7 includes, for example, a non-volatile storage element such as ROM (Read Only Memory) and a rewritable non-volatile storage element such as EEPROM (Electrically Erasable Programmable Read Only Memory) for storing the above-mentioned programs and information necessary therefor, a volatile storage element such as RAM which is to serve as a working memory, and a peripheral circuit. Further, the storage section 7 functionally includes a first measurement data storage unit 71 for storing first measurement data obtained by the ultrasonic wave measuring section 1 and data obtained by performing a predetermined information processing task on the first measurement data as described later, and a second measurement data storage unit 72 for storing second measurement data obtained by the vibration measuring section 3 and data obtained by performing a predetermined information processing task on the second measurement as described later. The storage section 7 may further include a relatively large-capacity storage device such as a hard disk for storing first and second measurement data obtained by the ultrasonic wave measuring section 1 and the vibration measuring section 3, respectively, and various types of data obtained by performing respective predetermined information processing tasks on the first and second measurement data.

The control processing section 2 controls each section of the rotating machine abnormality detection device AD in accordance with the respective function of each section in order to detect an abnormality in the rotating machine M and includes, for example, a microprocessor such as CPU (Central Processing Unit) and a peripheral circuit. The control processing section 2 executes a program to functionally configure a control unit 21 and an abnormality detecting unit 22.

The control unit 21 controls each section of the rotating machine abnormality detection device AD in accordance with the respective function of each section to thereby perform overall control of the rotating machine abnormality detection device AD.

The abnormality detecting unit 22 detects an initial abnormality in the rotating machine M based on first measurement data obtained by the ultrasonic wave measuring section 1. Preferably, the abnormality detecting unit 22 calculates a first frequency spectrum of the first measurement data obtained by the ultrasonic wave measuring section 1, and calculates a specific first feature amount in the first frequency spectrum of the first measurement data to detect an initial abnormality in the rotating machine M based on the first feature amount. The first feature amount is an amount (value) that indicates an event occurring in the first frequency spectrum in relation to an initial abnormality in the rotating machine M. In the present embodiment, the first feature amount is, for example, the integrated value within a predetermined frequency range of the first frequency spectrum of the first measurement data. In this case, the abnormality detecting unit 22 calculates the integrated value (integral area expressed as a quantitative value) within a predetermined frequency range of the first frequency spectrum of the first measurement data, and compares the calculated integrated value with a predetermined threshold value Th1 to determine that there is an initial abnormality in the rotating machine M when the integrated value is equal to or greater than the threshold value Th1.

In the present embodiment, the abnormality detecting unit 22 further determines, after detecting an initial abnormality, at least one of an abnormality type and an abnormality degree based on second measurement data obtained by the vibration measuring section 3. Preferably, the abnormality detecting unit 22 determines at least one of an abnormality type and an abnormality degree based on second measurement data (pre-second measurement data) obtained by the vibration measuring section 3 before the detection of an initial abnormality and second measurement data (post-second measurement data) obtained by the vibration measuring section 3 after the detection of the initial abnormality. The pre-second measurement data may be obtained at any time before the detection of an initial abnormality, for example, immediately before the detection of the initial abnormality or at a predetermined time before the detection of the initial abnormality. The pre-second measurement data are dealt as second measurement data obtained when the rotating machine M is in the normal state. The post-second measurement data may be obtained at any time after the detection of an initial abnormality, such as immediately after the detection of the initial abnormality or at a predetermined time after the detection of the initial abnormality. The post-second measurement data is dealt as second measurement data obtained when the rotating machine M is in an abnormal state (when the rotating machine M is not in the normal state). More preferably, the abnormality detecting unit 22 calculates a specific second feature amount in the pre-second measurement data and a third feature amount in the post-second measurement data that is of the same type as the second feature amount, to determine at least one of an abnormality type and an abnormal degree based on the second and third feature amounts. The second and third feature amounts are amounts (values) that indicate an event occurring in the pre-second measurement data and post-second measurement data in relation to an abnormality in the rotating machine M. In the present embodiment, for example, the second feature amount is for a second frequency spectrum of the pre-second measurement data obtained by the vibration measuring section 3 before the detection of an initial abnormality, and the third feature amount is for a third frequency spectrum of the post-second measurement data obtained by the vibration measuring section 3 after the detection of the initial abnormality. In this case, the abnormality detecting unit 22 compares the second frequency spectrum of the second measurement data with the third frequency spectrum of the second measurement data to determine at least one of an abnormality type and an abnormality degree based on a comparison result. As the second and third feature amounts, the mean square or the root mean square (RMS) may be used.

The rotary member RB of the present embodiment has the structure having been described with reference to FIGS. 2 and 3 and, therefore, in the present embodiment, abnormality types include a first abnormality in which the sub rotary members 81-1 and 81-2 come into contact with each other, and a second abnormality in which at least one of the sub rotary members 81-1 and 81-2 comes into contact with the casing 82.

The abnormality detecting unit 22 functionally includes, for example, an ultrasonic wave measurement processing part 221, a vibration measurement processing part 222, and a determination part 223, as shown in FIG. 1. The ultrasonic wave measurement processing part 221 performs the above-mentioned processing task on first measurement data obtained by the ultrasonic wave measuring section 1. The vibration measurement processing part 222 performs the above-described processing task on second measurement data obtained by the vibration measuring section 3. The determination part 223 determines the presence/absence of an initial abnormality in the rotating machine M based on a processing result of the ultrasonic wave measurement processing part 221 to thereby detect an initial abnormality in the rotating machine M, and determines at least one of an abnormality type and an abnormality degree based on a processing result of the vibration measurement processing part 222.

The above-described control processing section 2, the input section 4, the output section 5, the IF section 6, and the storage section 7 in the rotating machine abnormality detection device AD can be realized by a computer such as a desktop, laptop, tablet or other type of personal computer.

Figure 4:
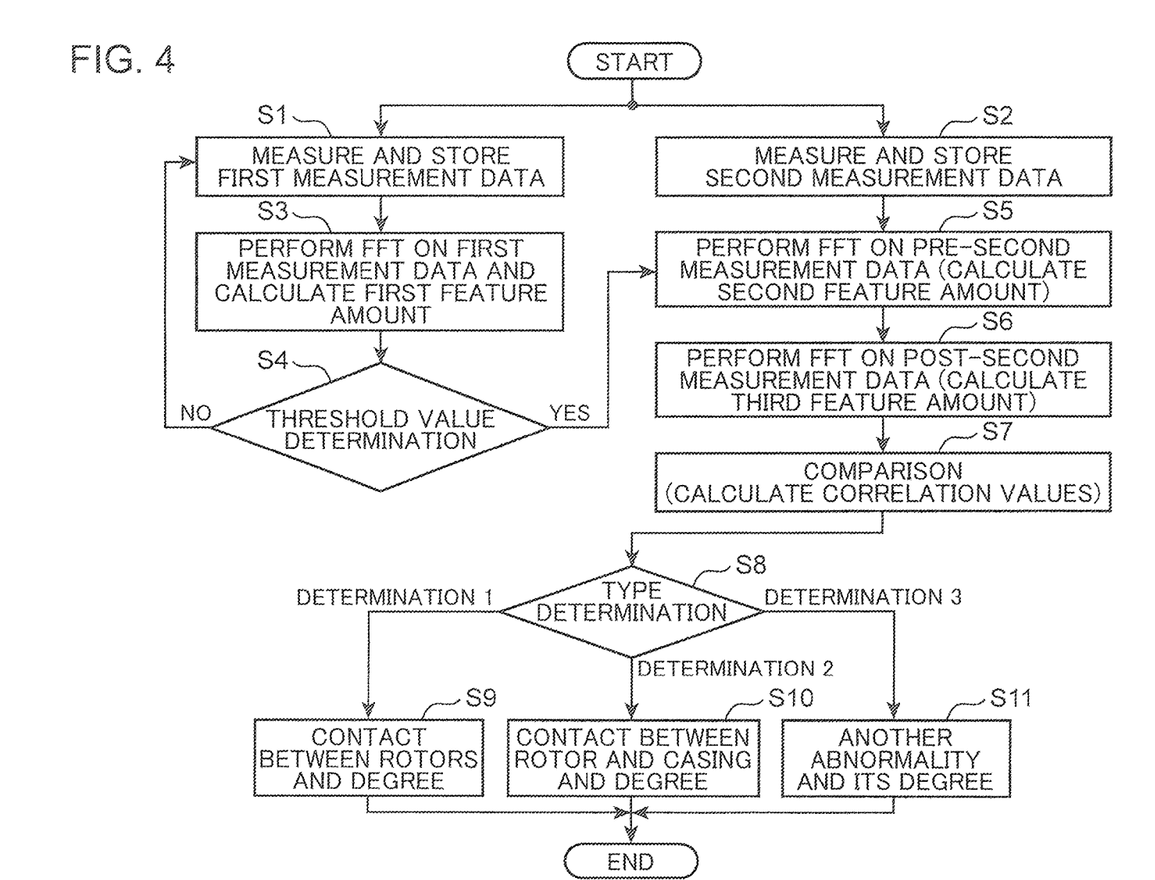
FIG. 4 is a flowchart of the operation of the rotating machine abnormality detection device in the embodiment.
Figure 5A:
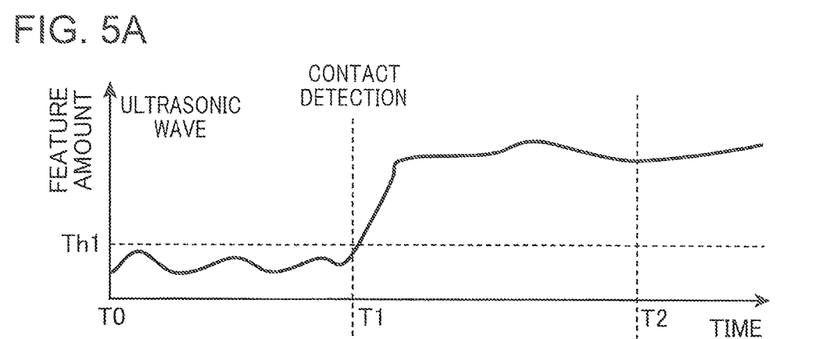
FIGS. 5A and 5B are graphs showing the chronological change in specific feature amounts.
Figure 5B:
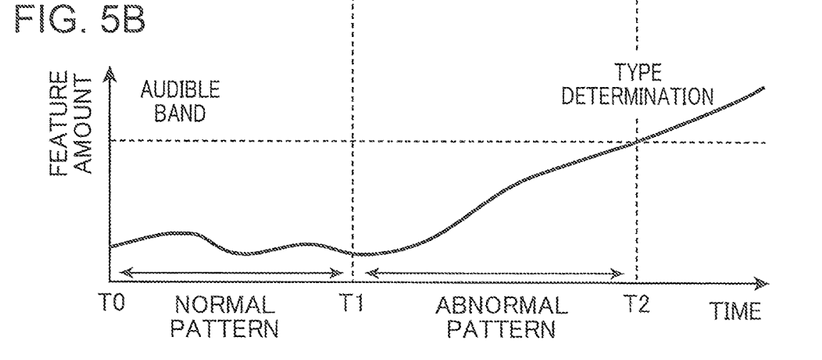
Figures 6A, 6B:
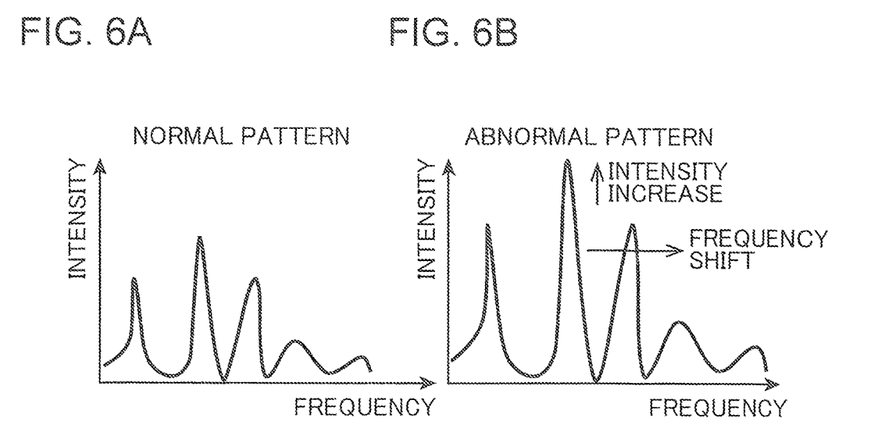
FIGS. 6A and 6B are graphs for explaining an example of abnormality diagnosis.

Now, the operations of the rotating machine M and the rotating machine abnormality detection device AD will be described. FIG. 4 is a flowchart of the operation of the rotating machine abnormality detection device in the embodiment. FIGS. 5A and 5B are graphs showing the chronological change in specific feature amounts. FIG. 5A shows the chronological change in the first feature amount with the horizontal axis representing time and the vertical axis representing magnitude (level) of the first feature amount. FIG. 5B shows the chronological change in the second and third feature amounts with the horizontal axis representing time and the vertical axis representing magnitude (level) of the second and third feature amounts. FIGS. 6A and 6B are graphs for explaining an example of abnormality diagnosis. FIG. 6A shows a frequency spectrum of second measurement data (an example of the second frequency spectrum of the pre-second measurement data) obtained when the rotating machine M is considered to be in the normal state with no abnormality in the rotating machine M being found, the horizontal axis of the graph representing frequency and the vertical axis of the graph representing intensity. FIG. 6B shows a frequency spectrum of second measurement data (an example of the third frequency spectrum of the post-second measurement data) obtained when the rotating machine M is considered to be in an abnormal state due to an abnormality occurring in the rotating machine M, the horizontal axis of the graph representing frequency and the vertical axis of the graph representing intensity.

Upon start of the operation of the rotating machine M caused by, for example, a user's manipulation of an unillustrated activation switch, the rotating machine abnormality detection device AD executes the rotating machine abnormality detection program. The execution of the rotating machine abnormality detection program causes the control unit 21 and the abnormality detecting unit 22 to run on the control processing section 2, causes the first measurement data storage unit 71 and the second measurement data storage unit 72 to run on the storage section 7, and causes the ultrasonic wave measurement processing part 221, the vibration measurement processing part 222, and the determination part 223 to run on the abnormality detecting unit 22. The rotating machine abnormality detection device AD then performs the following operation steps to detect an initial abnormality in the rotating machine M, an abnormality type and the like.

First, the ultrasonic wave measuring section 1 detects a vibration in the ultrasonic wave band in the rotating machine M and outputs a measurement result of the vibration in the ultrasonic wave band as first measurement data to the control processing section 2, and the vibration measuring section 3 detects a vibration in the audible band in the rotating machine M and outputs a measurement result of the vibration in the audible band as second measurement data to the control processing section 2.

Under such conditions, at step S1, the ultrasonic wave measurement processing part 221 of the abnormality detecting unit 22 samples the first measurement data inputted from the ultrasonic wave measuring section 1 at the first sampling intervals and stores them in the first measurement data storage unit 71 of the storage section 7. In this manner, the first measurement data are successively measured at the first sampling intervals, and stored in the storage unit 71. On the other hand, at step S2 performed during the execution of step S1, the vibration measurement processing part 222 of the abnormality detecting unit 22 samples the second measurement data inputted from the vibration measuring section 3 at the second sampling intervals and stores them in the second measurement data storage unit 72 of the storage section 7. In this manner, the second measurement data are successively measured at the second sampling intervals, and stored in the storage unit 72.

Thereafter, at step S3, the ultrasonic wave measurement processing part 221 performs Fast Fourier Transform (FFT) on plural sets of first measurement data stored in the first measurement data storage unit 71, the sets of data including the most recently measured first measurement data and being arranged in chronological order within a predetermined time period (first time period) (i.e. each set of first measurement data obtained within the first time period ending at the most recent measurement time point), to calculate the first frequency spectrum and the first feature amount in the first frequency spectrum of the first measurement data. Thereafter, the ultrasonic wave measurement processing part 221 stores the calculated first frequency spectrum and the first feature amount in the first measurement data storage unit 71. More specifically, in the present embodiment, the ultrasonic wave measurement processing part 221 calculates, as the first feature amount, the integrated value within the above-mentioned frequency range of the first frequency spectrum of the first measurement data.

Thereafter, at step S4, the determination part 223 of the abnormality detecting unit 22 determines the presence/absence of an initial abnormality in the rotating machine M based on the first feature amount calculated at step S3. More specifically, in the present embodiment, the determination part 223 compares the integrated value calculated as the first feature amount at step S3 with the threshold value Th1. When, as a result of the comparison, the integrated value is equal to or greater than the threshold value Th1 (Yes), the determination part 223 determines that there is an initial abnormality in the rotating machine M and causes the vibration measurement processing part 222 to perform step S5. On the other hand, when, as a result of the comparison, the integrated value is less than the threshold value Th1 (No), the determination part 223 determines that there is no initial abnormality in the rotating machine M and returns the operation to step S1.

The initial abnormality is preferred to include the time of occurrence of an abnormality. In this case, the integrated value is compared with the threshold value Th1, and the time point at which the integrated value becomes equal to or greater than the threshold value Th1 is regarded as the time of occurrence of an abnormality. In this manner, the rotating machine abnormality detection device AD can detect the time of occurrence (the occurrence timing) of an abnormality in the rotating machine M.

Further, when it is determined that there is an initial abnormality in the rotating machine M, the determination part 223 may output the determination result to the output section 5. For example, when the output section 5 is in the form of a display device, the determination part 223 outputs a message indicating that there is an initial abnormality in the rotating machine M (such as a message reading "an initial abnormality has occurred") to the output section 5. Alternatively, when the output section 5 is in the form of a sound generator such as speaker or buzzer, for example, the determination part 223 outputs to the output section 5, an alarm (warning sound) indicating that there is an initial abnormality in the rotating machine M. Alternatively, when the output section 5 is in the form of a light source such as light-emitting diode (LED), the determination part 223 outputs to the output section 5, an alarm beam (warning beam) indicating that there is an initial abnormality in the rotating machine M.

Further, when the ultrasonic wave measuring section 1 includes a plurality of ultrasonic wave measuring units, first measurement data obtained by each ultrasonic wave measuring unit 1 are subjected to the above-described steps S1, S3 and S4. When it is determined, in any of the determinations based on the respective first measurement data, that there is an initial abnormality in the rotating machine M, step S5 is performed.

When it is determined at step S4 that an initial abnormality is detected, at step S5, the vibration measurement processing part 222 calculates the second feature amount in pre-second measurement data obtained by the vibration measuring section 3 before the detection of the initial abnormality. More specifically, the vibration measurement processing part 222 performs FFT on plural sets of pre-second measurement data stored in the second measurement data storage unit 72 and arranged in chronological order within a predetermined time period (pre-time period), to calculate the second frequency spectrum as the second feature amount. Thereafter, the vibration measurement processing part 222 stores the calculated second frequency spectrum (second feature amount) in the second measurement data storage unit 72. The pre-second measurement data are, as mentioned above, second measurement data obtained when the rotating machine M is in the normal state and, therefore, the second frequency spectrum (second feature amount) calculated based on the pre-second measurement data obtained in the normal state is dealt as a normal pattern.

The storage region of the second measurement data storage unit 72 for storing the pre-second measurement data is preferred to be a ring buffer having a capacity to store the pre-second measurement data within the pre-time period (for example, several minutes such as one or ten minutes). In this case, upon determination that an initial abnormality is detected at step S4, the vibration measurement processing part 222 performs FFT on all data stored in the storage region of the second measurement data storage unit 72 for storing the pre-second measurement data to thereby automatically calculate the second frequency spectrum as the second feature amount without performing screening of the second measurement data stored in the second measurement data storage unit 72. Further, the storage region of the second measurement data storage unit 72 for storing pre-second measurement data may use the First-In, First-Out (FIFO) Method.

Thereafter, at step S6, the vibration measurement processing part 222 calculates the third feature amount in post-second measurement data obtained by the vibration measuring section 3 after the detection of the initial abnormality. More specifically, the vibration measurement processing part 222 performs, upon elapse of a predetermine time period (post-time period) after the detection of the initial abnormality, FFT on plural sets of post-second measurement data stored in the second measurement data storage unit 72 and arranged in chronological order within the post-time period, to calculate the third frequency spectrum for the third feature amount. Thereafter, the vibration measurement processing part 222 stores the calculated third frequency spectrum (third feature amount) in the second measurement data storage unit 72. The post-second measurement data are, as mentioned above, second measurement data obtained when the rotating machine M is not in the normal state but in the abnormal state, and therefore, the third frequency spectrum (third feature amount) calculated based on the second measurement data obtained in the abnormal state is dealt as an abnormal pattern.

It should be noted that the pre-time period and the post-time period may be equal to or different from each other. The pre-time period and the post-time period are preferred to be equal to each other for relative comparison and, furthermore, for standardization.

Thereafter, at step S7, the determination part 223 compares the second frequency spectrum of the second measurement data calculated at step S5 and the third frequency spectrum of the second measurement data calculated at step S6 and, subsequently at step S8, the determination part 223 determines at least one of, in the present embodiment, both of an abnormality type and an abnormality degree based on a comparison result at step S7. For example, comparison results between second frequency spectrums and third frequency spectrums of second measurement data are obtained according to abnormality types and degrees in advance, and correspondences between the abnormality types and degrees and the comparison results are stored in the storage section 7 in advance. The abnormality types include, in the present embodiment, the first abnormality in which the sub rotary members 81-1 and 81-2 come into contact with each other, and the second abnormality in which at least one of the sub rotary members 81-1 and 81-2 comes into contact with the casing 82. At step S8, the determination part 223 refers to the correspondences stored in the storage section 7 to determine an abnormality type and an abnormality degree based on the comparison result at step S7. When, as a result of the determination, the first abnormality is determined (determination 1), the determination part 223 performs step S9 of outputting to the output section 5 information indicating occurrence of the first abnormality in which the sub rotary members 81-1 and 81-2 come into contact with each other, and the degree of the abnormality, and then terminates the operation. When, as a result of the determination, the second abnormality is determined (determination 2), the determination part 223 performs step S10 of outputting to the output section 5 information indicating occurrence of the second abnormality in which at least one of the sub rotary members 81-1 and 81-2 comes into contact with the casing 82, and the degree of the abnormality, and then terminates the operation. Further, when, as a result of the determination, neither the first abnormality (determination 1) nor the second abnormality (determination 2) is determined (i.e. when it is determined that the abnormality is neither the first abnormality nor the second abnormality) (determination 3), the determination part 223 performs step S11 of outputting to the output section 5 information indicating occurrence of another abnormality different from the first and second abnormalities, and terminates the operation. As an example of the another abnormality, a slight contact in a bearing can be considered. As described, the abnormalities in the present embodiment include abnormalities in the rotating machine M due to a contact.

More specifically, when the rotational period of the first sub rotary member 81-1 is CT1, the rotational period of the second sub rotary member 81-2 is CT2, and the ratio between the number of projecting portions 812-1 of the first sub rotary member 81-1 and the number of recessed portions 812-2 of the second sub rotary member 81-2 is a:b, the intensity of the frequency corresponding to the period indicated by CT1×b=CT2×a in the third frequency spectrum in the abnormal pattern differs from that in the second frequency spectrum in the normal pattern in occurrence of the first abnormality. Further, in the case that a projecting portion 812-1 of the first sub rotary member 81-1 comes into contact with the casing 82 in the second abnormality, the intensity of the frequency corresponding to the period of CT1 in the third frequency spectrum is different from that in the second frequency spectrum. Further, in the case that a projecting portion of the second sub rotary member 81-2 that defines a recessed portion 812-2 comes into contact with the casing 82 in the second abnormality, the intensity of the frequency corresponding to the period of CT2 is different from that in the second frequency spectrum. Therefore, for example, it is possible to determine an abnormality type by comparing the second frequency spectrum in the normal pattern and the third frequency spectrum in the abnormal pattern and finding the frequency that has meaningfully different intensities between the second and third frequency spectrums.

On the other hand, when the abnormality in the rotating machine M develops, an abnormal noise increases or becomes a high pitched tone. Consequently, the third frequency spectrum has a high overall intensity and the frequency having the maximum intensity (at a peak) shifted to a high tone range as compared to the second frequency spectrum. Therefore, for example, it is possible to determine an abnormality degree by comparing the second frequency spectrum in the normal pattern and the third frequency spectrum in the abnormal pattern and finding a meaningful difference in the maximum intensity. In this case, the abnormality degree increases as the difference in the maximum intensity increases. Further in another example, it is possible to determine an abnormality degree by comparing the second frequency spectrum in the normal pattern and the third frequency spectrum in the abnormal pattern and finding a meaningful shift amount of the frequency having the maximum intensity. In this case, the abnormality degree increases as the frequency shift amount increases. Further in another example, it is possible to calculate a correlation value between the second frequency spectrum in the normal pattern and the third frequency spectrum in the abnormal pattern in the above-mentioned comparison, and determine an abnormality degree based on the correlation value. In this case, the abnormality degree increases as the correlation value decreases. Alternatively, a deviation may be calculated as the reciprocal of the correlation value to determine an abnormality degree based on the deviation. In this case, the abnormality value increases as the deviation increases.

In this manner, the abnormality detecting unit 22 determines, after the detection of an initial abnormality, at least one of, in the present embodiment, both of an abnormality type and an abnormal degree based on pre-second measurement data obtained by the vibration measuring section 3 before the detection of the initial abnormality and post-second measurement data obtained by the vibration measuring section 3 after the detection of the initial abnormality (steps S5 to S11). Although in the present embodiment, both an abnormality type and an abnormality degree are determined, but it may be configured to determine at least one of them.

Further, when the vibration measuring section 3 includes a plurality of vibration measuring units, second measurement data obtained by each vibration measuring unit 3 are subjected to the above-described steps S5 to S11. Thereafter, determination based on each second measurement data is outputted to the output section 5. When the vibration measuring section 3 includes a plurality of vibration measuring units, a contact position can also be estimated using the so-called triangulation based on the difference in time required for the same vibration in the audible band to reach each vibration measuring unit 3, the vibration being caused by the rotary member RB.

The above-described steps can be explained by the following example. For example, as shown in FIG. 5A, by the execution of the above-described steps S1, S3 and S4, the first feature amount is repeatedly calculated from the time T0 after the start of operation of the rotating machine M, and in occurrence of an abnormality in the rotating machine M, the first feature amount starts to increase and becomes equal to or greater than the threshold value Th1 at the time T1 to allow determination of occurrence of an initial abnormality in the rotating machine M. During this time, the above-described step S2 is also performed.

During the execution of steps S1, S3 and S4, the vibration measurement processing part 222 may perform a similar operation to that of the ultrasonic measurement processing part 221. Specifically, the vibration measurement processing part 222 performs FFT on plural sets of second measurement data stored in the second measurement data storage unit 72, the sets of data including the most recently measured second measurement data and being arranged in chronological order within the pre-time period (i.e. each set of second measurement data obtained within the pre-time period ending at the most recent measuring time point), to calculate the second frequency spectrum, and the integrated value within a predetermined second frequency range of the calculated second frequency spectrum of the second measurement data as a specific fourth feature amount. The chronological change in the fourth feature amount is shown in FIG. 5B.

When the first feature amount is equal to or greater than the threshold value Th1 at the time T1, the above-described step S5 is performed to calculate the second frequency spectrum of second measurement data as the second feature amount. An example of the second frequency spectrum (second feature amount) of second measurement data is shown in FIG. 6A. Thereafter, at the time T2 after elapse of the post-time period from the time T1, the above-described step S6 is performed to calculate the third frequency spectrum of second measurement data as the third feature amount. An example of the second frequency spectrum (third feature amount) of second measurement data is shown in FIG. 6B.

In the example shown in FIG. 6, the third frequency spectrum in the abnormal pattern has a high overall intensity, a different maximum intensity, and the frequency having the maximum intensity shifted to a high tone range as compared to the second frequency spectrum in the normal pattern. This corresponds to a case where the noise of the rotating machine M heard via a listening rod gradually increases in volume and slightly changes in tone as an abnormality develops.

Thereafter, the above-described steps S7 and S8 are performed to compare, in this example, the second frequency spectrum in the normal pattern shown in FIG. 6A and the third frequency spectrum in the abnormal pattern shown in FIG. 6B to determine an abnormality type and an abnormality degree, and subsequently, the above-described step S9 or step S11 is performed according to a determination result, and then the operation is terminated.

As described above, the rotating machine abnormality detection device AD and the rotating machine M (i.e. compressor as an example) according to the present embodiment include the ultrasonic wave measuring section 1 for measuring a vibration in the ultrasonic wave band caused by the rotary member RB. This makes it possible, in accordance with the above-described ideas of the present inventors, to detect an initial abnormality in the rotating machine M based on first measurement data obtained as a result of measurement by the ultrasonic wave measuring section 1. In particular, a contact between the first and second sub rotary members 81-1 and 81-2 in the compressor may generate heat to cause thermal expansion of the first and second sub rotary members 81-1 and 81-2, which may lead to a relatively serious accident. Therefore, the detection of an initial abnormality in the rotating machine M is advantageous.

In the rotating machine M, the rotary member RB, i.e. the first and second sub rotary members 81-1 and 81-2 in the present embodiment, rotates at a predetermined speed. Therefore, a change in the intensity of a specific frequency, a shift of the frequency that is at a peak, or the like occurs in occurrence of an abnormality as described above, which changes the shape (profile or pattern) of the frequency spectrum. Therefore, the rotating machine abnormality detection device AD and the rotating machine M according to the present embodiment can properly detect an initial abnormality because an initial abnormality in the rotating machine M is detected based on the first feature amount in the first frequency spectrum of first measurement data.

Further, the change in the frequency spectrum shape is reflected in the integrated value within the above-mentioned frequency range of the first frequency spectrum of first measurement data. Therefore, the rotating machine abnormality detection device AD and the rotating machine M according to the present embodiment can properly detect an initial abnormality in the rotating machine M because an initial abnormality is detected based on a comparison result between the integrated value and the threshold value Th1.

Further, the rotating machine abnormality detection device AD and the rotating machine M according to the present embodiment perform the above-described determination step after the detection of an initial abnormality, which can reduce redundant operational steps. Further, the rotating machine abnormality detection device AD and the rotating machine M according to the present embodiment further include the vibration measuring section 3 for measuring a vibration in the audible band caused by the rotary member RB. This makes it possible, in accordance with the ideas conceived by the inventors of the present invention, to determine at least one of an abnormality type and an abnormality degree in the rotating machine based on at least one of the manner of change and the intensity of second measurement data obtained by the vibration measuring section 3.

As described above, the second measurement data obtained by the vibration measuring section 3 before the detection of an initial abnormality reflects the normal state of the rotating machine M in which no abnormality occurs in the rotating machine M and, on the other hand, the second measurement data obtained by the vibration measuring section 3 after the detection of the initial abnormality reflects the abnormal state of the rotating machine in which an abnormality occurs in the rotating machine M. Therefore, the rotating machine abnormality detection device AD and the rotating machine M according to the present embodiment can properly determine at least one of (in the present embodiment, both of) an abnormality type and an abnormality degree because at least one of (in the present embodiment, both of) an abnormality type and an abnormality degree is determined based on these two sets of second measurement data.

In occurrence of an abnormality in the rotating machine M, the intensity of a specific frequency increases according to the type and the degree of the abnormality, for example, and consequently, the noise in the audible band changes in tone and volume. As a result, the second measurement data change. Therefore, the rotating machine abnormality detection device AD and the rotating machine M according to the present embodiment can properly determine at least one of (in the present embodiment, both of) an abnormality type and an abnormality degree because at least one of (in the present embodiment, both of) an abnormality type and an abnormality degree is determined based on the specific second and third feature amounts of the same type of the above-mentioned two sets of second measurement data.

The change in the second measurement data is reflected in the second and third spectrums of these two sets of second measurement data. Therefore, the rotating machine abnormality detection device AD and the rotating machine M according to the present embodiment can properly determine at least one of (in the present embodiment, both of) an abnormality type and an abnormality degree because at least one of (in the present embodiment, both of) an abnormality type and an abnormality degree is determined based on a result of comparison between these second and third frequency spectrums.

It should be noted that, in the above-described embodiment, the rotary member RB of the rotating machine M includes the pair of first and second sub rotary members 81-1 and 81-2, but the number of sub rotary members is not limited to two. The rotary member RB may be configured to include a single (one) sub rotary member or a plurality of sub rotary members.

The present specification discloses techniques having various aspects as described, among which main techniques are summarized below.

A rotating machine abnormality detection device according to an aspect is a rotating machine abnormality detection device for detecting an abnormality in a rotating machine including a rotary member rotatable about a predetermined axis, comprising: an ultrasonic wave measuring section for measuring a vibration in an ultrasonic wave band caused by the rotary member; and an abnormality detecting section for detecting an initial abnormality in the rotating machine based on first measurement data obtained by the ultrasonic wave measuring section.

Based on various studies, the present inventors consider that, in occurrence of an abnormality in the rotating machine, a vibration in the ultrasonic wave band (ultrasonic wave range) occurs at its initial stage and a vibration in the audible band (audible range) also occurs as the abnormality develops, and that it is possible, after detection of a signal change in the ultrasonic wave range (after detection of an initial abnormality), to determine an abnormality type and the like by reviewing a measurement result within a range over several seconds or minutes before the detection time point (including a range after the detection time point).

In accordance with the above-described ideas, the rotating machine abnormality detection device includes the ultrasonic wave measuring section for measuring a vibration in the ultrasonic wave band caused by the rotary member, which makes it possible to detect an initial abnormality in the rotating machine based on first measurement data obtained as a result of the measurement. The ultrasonic wave band includes vibrations at frequencies that are so high that people having a normal hearing ability do not hear them, such as vibrations at a frequency of 100 kHz or more. The audible band includes vibrations at frequencies audible by people having a normal hearing ability, such as vibrations at a frequency in the range between 20 Hz and 20 kHz.

According to another aspect, in the above-described rotating machine abnormality detecting device, the abnormality detecting section calculates a first frequency spectrum of the first measurement data obtained by the ultrasonic wave measuring section, and calculates a specific first feature amount in the first frequency spectrum of the first measurement data to detect an initial abnormality in the rotating machine based on the first feature amount.

In the rotating machine, the rotary member rotates at a predetermined speed. Therefore, a change in the intensity of a specific frequency, a shift of the frequency that is at a peak, or the like occurs in occurrence of an abnormality as described above, which changes the shape (profile or pattern) of the frequency spectrum. Therefore, the above-described rotating machine abnormality detection device can properly detect an initial abnormality because an initial abnormality in the rotating machine is detected based on the specific first feature amount in the first frequency spectrum.

According to another aspect, in the above-described rotating machine abnormality detecting device, the first feature amount is an integrated value within a predetermined frequency range of the first frequency spectrum of the first measurement data, and the abnormality detecting section compares the calculated integrated value with a predetermined threshold value, and determines that there is an initial abnormality in the rotating machine when the integrated value is equal to or greater than the threshold value.

A change in the frequency spectrum shape is reflected in the integrated value within the predetermined frequency range of the first frequency spectrum of first measurement data. Therefore, the above-described rotating machine abnormality detection device can properly detect an initial abnormality in the rotating machine because an initial abnormality is detected based on a comparison result between the integrated value and the predetermined threshold value.

Further, in the above-described rotating machine abnormality detection devices, the initial abnormality is preferred to include the time of occurrence of an abnormality. Such rotating machine abnormality detection devices can detect the time of occurrence (the occurrence timing) of an abnormality in the rotating machine by comparing the calculated integrated value with the predetermined threshold value and determining the time point at which the integrated value becomes equal to or greater than the threshold value as the time of occurrence of an abnormality.

According to another aspect, in the above-described rotating machine abnormality detection devices, a vibration measuring section for measuring a vibration in an audible band caused by the rotary member is further included, and the abnormality detecting section determines, after detecting an initial abnormality, at least one of an abnormality type and an abnormality degree based on second measurement data obtained by the vibration measuring section.

Such rotating machine abnormality detection device performs the determination after the detection of an initial abnormality, which can reduce redundant operational steps. Further, based on studies made by the present inventors, it is considered, as described above, that in occurrence of an abnormality in the rotating machine, the manner of change in a vibration in the audible band differs according to the type of the abnormality and the intensity of the vibration in the audible band increases as the abnormality develops. The above-described rotating machine abnormality detection device further includes the vibration measuring section for measuring a vibration in the audible band caused by the rotary member and, which makes it possible to detect at least one of an abnormality type and an abnormality degree in the rotating machine based on at least one of the manner of change and the intensity of second measurement data obtained by the vibration measuring section.

According to another aspect, in the above-described rotating machine abnormality detection device, the abnormality detecting section determines at least one of an abnormality type and an abnormality degree based on second measurement data obtained by the vibration measuring section before the detection of an initial abnormality and second measurement data obtained by the vibration measuring section after the detection of the initial abnormality.

The second measurement data obtained by the vibration measuring section before the detection of an initial abnormality reflects the normal state of the rotating machine in which no abnormality occurs in the rotating machine and, on the other hand, the second measurement data obtained by the vibration measuring section after the detection of the initial abnormality reflects the abnormal state of the rotating machine in which an abnormality occurs in the rotating machine. Therefore, the above-described rotating machine abnormality detection device can properly determine at least one of an abnormality type and an abnormality degree because at least one of an abnormality type and an abnormality degree is determined based on these two sets of second measurement data.

According to another aspect, in the above-described rotating machine abnormality detection device, the abnormality detecting section calculates a specific second feature amount in the second measurement data obtained by the vibration measuring section before the detection of an initial abnormality and a third feature amount in the second measurement data that is of the same type as the second feature amount and obtained by the vibration measuring section after the detection of the initial abnormality, to determine at least one of an abnormality type and an abnormality degree based on the second and third feature amounts.

In occurrence of an abnormality in the rotating machine, the intensity of a specific frequency increases according to the type and the degree of the abnormality, for example, and consequently, the noise in the audible band changes in tone and volume. As a result, the second measurement data change. Therefore, the above-described rotating machine abnormality detection device can properly determine at least one of an abnormality type and an abnormality degree because at least one of an abnormality type and an abnormality degree is determined based on the specific second and third feature amounts of the same type of the above-mentioned two sets of second measurement data.

According to another aspect, in the above-described rotating machine abnormality detection device, the second feature amount is for a second frequency spectrum of the second measurement data obtained by the vibration measuring section before the detection of an initial abnormality, the third feature amount is for a third frequency spectrum of the second measurement data obtained by the vibration measuring section after the detection of the initial abnormality, and the abnormality detecting section compares the second frequency spectrum of the second measurement data with the third frequency spectrum of the second measurement data to determine at least one of an abnormality type and an abnormality degree based on a comparison result.

The change in the second measurement data is reflected in the second and third spectrums of these two sets of second measurement data. Therefore, the above-described rotating machine abnormality detection device can properly determine at least one of an abnormality type and an abnormality degree because at least one of an abnormality type and an abnormality degree is determined based on a result of comparison between these second and third spectrums.

According to another aspect, in the above-described rotating machine abnormality detection devices, the rotary member includes a pair of sub rotary members engageable with each other, and a casing housing the pair of sub rotary members, and abnormality types include a first abnormality in which the sub rotary members come into contact with each other, and a second abnormality in which at least one of the sub rotary members comes into contact with the casing.

Such rotating machine abnormality detection device can distinguish between at least the first abnormality in which the sub rotary members come into contact with each other, and the second abnormality in which at least one of the sub rotary members comes into contact with the casing.

A rotating machine according to another aspect includes any one of the above-described rotating machine abnormality detection devices.

According to this configuration, a rotating machine including any one of the above-described rotating machine abnormality detection devices is provided, the rotating machine being capable of detecting an initial abnormality.

A rotating machine abnormality detection method according to another aspect is a rotating machine abnormality detection method for detecting an abnormality in a rotating machine including a rotary member rotatable about a predetermined axis, comprising: an ultrasonic wave measuring step of measuring a vibration in an ultrasonic wave band caused by the rotary member; and an abnormality detecting step of detecting an initial abnormality in the rotating machine based on first measurement data obtained in the ultrasonic wave measuring step.

Such rotating machine abnormality detection method includes the ultrasonic wave measuring step of measuring a vibration in the ultrasonic wave band caused by the rotary member, which makes it possible to detect an initial abnormality in the rotating machine based on first measurement data obtained as a result of the measurement.

This application is based on Japanese Patent Application No. 2014-185873 filed in Japan Patent Office on Sep. 12, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

The present invention can provide rotating machine abnormality detection device and method and a rotating machine.

The invention claimed is:

1. A rotating machine abnormality detection device for detecting an abnormality in a rotating machine including a rotary member rotatable about a predetermined axis, comprising:
an ultrasonic wave measuring section for measuring a vibration in an ultrasonic wave band caused by the rotary member;
an abnormality detecting section for detecting an initial abnormality in the rotating machine based on first measurement data obtained by the ultrasonic wave measuring section; and
a vibration measuring section for measuring a vibration in an audible band caused by the rotary member, wherein
the abnormality detecting section determines, after detecting the initial abnormality, at least one of an abnormality type and an abnormality degree based on second measurement data obtained by the vibration measuring section,
the rotary member includes a pair of sub rotary members engageable with each other, and a casing housing the pair of sub rotary members,
abnormality types include a first abnormality in which the sub rotary members come into contact with each other, and a second abnormality in which at least one of the sub rotary members comes into contact with the casing, and
the ultrasonic wave measuring section and the vibration measuring section are mounted on an outer surface of the casing.

2. A rotating machine abnormality detection device according to claim 1, wherein
the abnormality detecting section calculates a first frequency spectrum of the first measurement data obtained by the ultrasonic wave measuring section, and calculates a specific first feature amount in the first frequency spectrum of the first measurement data to detect an initial abnormality in the rotating machine based on the first feature amount.

3. A rotating machine abnormality detection device according to claim 2, wherein:
the first feature amount is an integrated value within a predetermined frequency range of the first frequency spectrum of the first measurement data; and
the abnormality detecting section compares the calculated integrated value with a predetermined threshold value, and determines that there is an initial abnormality in the rotating machine when the integrated value is equal to or greater than the threshold value.

4. A rotating machine abnormality detection device according to claim 1, wherein
the abnormality detecting section determines at least one of an abnormality type and an abnormality degree based on second measurement data obtained by the vibration measuring section before the detection of an initial abnormality and second measurement data obtained by the vibration measuring section after the detection of the initial abnormality.

5. A rotating machine abnormality detection device according to claim 4, wherein
the abnormality detecting section calculates a specific second feature amount in the second measurement data obtained by the vibration measuring section before the detection of an initial abnormality and a third feature amount in the second measurement data that is of the same type as the second feature amount and obtained by the vibration measuring section after the detection of the initial abnormality, to determine at least one of an abnormality type and an abnormality degree based on the second and third feature amounts.

6. A rotating machine abnormality detection device according to claim 5, wherein:
the second feature amount is for a second frequency spectrum of the second measurement data obtained by the vibration measuring section before the detection of an initial abnormality;
the third feature amount is for a third frequency spectrum of the second measurement data obtained by the vibration measuring section after the detection of the initial abnormality; and
the abnormality detecting section compares the second frequency spectrum of the second measurement data with the third frequency spectrum of the second measurement data to determine at least one of an abnormality type and an abnormality degree based on a comparison result.

7. A rotating machine abnormality detection device according to claim 6, wherein
the pair of sub rotary members includes a first sub rotary member and a second sub rotary member, the first sub rotary member has a plurality of projecting portions and the second sub rotary members has a plurality of recessed portions, the first sub rotary member rotates counterclockwise and the second sub rotary member rotates clockwise so that corresponding ones of projecting portions and the recessed portions are facing each other with a predetermined gap,
the abnormality detecting section determines as an occurrence of the first abnormality when an intensity of a frequency corresponding to a period indicated by $CT1 \times b = CT2 \times a$ in the third frequency spectrum differs from that in the second frequency spectrum in a normal pattern;
where a rotational period of the first sub rotary member is CT1, a rotational period of the second sub rotary member is CT2, and a ratio between the number of projecting portions of the first sub rotary member and the number of recessed portions of the second sub rotary member is a:b.

8. A rotating machine abnormality detection device according to claim 6, wherein
the pair of sub rotary members includes a first sub rotary member and a second sub rotary member, the first sub rotary member has a plurality of projecting portions and the second sub rotary members has a plurality of recessed portions, the first sub rotary member rotates counterclockwise and the second sub rotary member rotates clockwise so that corresponding ones of projecting portions and the recessed portions are facing each other with a predetermined gap,
the abnormality detecting section determines as an occurrence of the second abnormality when an intensity of a frequency corresponding to a period of CT1 in the third frequency spectrum is different from that in the second frequency spectrum in a case that a projecting portion of the first sub rotary member comes into contact with the casing; and the abnormality detecting section determines as an occurrence of the second abnormality when an intensity of a frequency corresponding to a period of CT2 is different from that in the second frequency spectrum in a case that a projecting portion of the second sub rotary member that defines a recessed portion comes into contact with the casing, where a rotational period of the first sub rotary member is CT1, a rotational period of the second sub rotary member is CT2.

9. A rotating machine, comprising a rotating machine abnormality detection device according to claim 1.

10. A rotating machine abnormality detection device according to claim 1, wherein the pair of sub rotary members includes a first sub rotary member and a second sub rotary member, the first sub rotary member has a plurality of projecting portions and the second sub rotary members has a plurality of recessed portions, the first sub rotary member rotates counterclockwise and the second sub rotary member rotates clockwise so that corresponding ones of projecting portions and the recessed portions are facing each other with a predetermined gap, and wherein the projecting portion and the recessed portion are not in contact with each other and define the predetermined gap G therebetween in a normal state.

11. A rotating machine abnormality detection method for detecting an abnormality in a rotating machine including a rotary member rotatable about a predetermined axis, the rotary member including a pair of sub rotary members engageable with each other, and a casing housing the pair of sub rotary members, the method comprising:

an ultrasonic wave measuring step of measuring a vibration in an ultrasonic wave band caused by the rotary member using an ultrasonic wave measuring section mounted on an outer surface of the casing;

an abnormality detecting step of detecting an initial abnormality in the rotating machine based on first measurement data obtained in the ultrasonic wave measuring step;

a vibration measuring step of measuring a vibration in an audible band caused by the rotary member using a vibration measuring section mounted on an outer surface of the casing; and a second abnormality detecting step of determining, after detecting the initial abnormality, at least one of an abnormality type and an abnormality degree based on second measurement data obtained in the vibration measuring step, abnormality types including a first abnormality in which the sub rotary members come into contact with each other, and a second abnormality in which at least one of the sub rotary members comes into contact with the casing.

* * * * *